(12) United States Patent
Haupt et al.

(10) Patent No.: US 7,346,073 B2
(45) Date of Patent: Mar. 18, 2008

(54) PHYSICAL LAYER CIRCUIT AND INTERFACE CIRCUIT

(75) Inventors: Dieter Haupt, Springe (DE); Klaus Gaedke, Hannover (DE); Siegfried Schweidler, Gehrden (DE)

(73) Assignee: Thomson Licensing, Boulogne-Billancourt (FR)

( * ) Notice: Subject to any disclaimer, the term of this patent is extended or adjusted under 35 U.S.C. 154(b) by 773 days.

(21) Appl. No.: 10/501,820

(22) PCT Filed: Jan. 11, 2003

(86) PCT No.: PCT/EP03/00203

§ 371 (c)(1),
(2), (4) Date: Jul. 19, 2004

(87) PCT Pub. No.: WO03/063432

PCT Pub. Date: Jul. 31, 2003

(65) Prior Publication Data

US 2005/0033894 A1 Feb. 10, 2005

(30) Foreign Application Priority Data

Jan. 25, 2002 (EP) .................................. 02090038

(51) Int. Cl.
*H04L 12/66* (2006.01)
(52) U.S. Cl. ..................................................... 370/463
(58) Field of Classification Search ................ 370/463, 370/489, 423; 710/100, 305, 306
See application file for complete search history.

(56) References Cited

U.S. PATENT DOCUMENTS

2005/0012399 A1* 1/2005 Yoshida ..................... 307/125

2005/0047352 A1* 3/2005 Burdin et al. ............... 370/254
2006/0017811 A1* 1/2006 Mizutani .................. 348/207.1

FOREIGN PATENT DOCUMENTS

EP 1134937 9/2001
FR 2786355 5/2000

OTHER PUBLICATIONS

Search report dated Feb. 18, 2003.

* cited by examiner

*Primary Examiner*—Ajit Patel
(74) *Attorney, Agent, or Firm*—Joseph J. Laks; Robert B. Levy

(57) ABSTRACT

The invention deals with a physical layer circuit for the IEEE1394 bus. Considered is a scenario where two clusters of 1394 devices are linked to each other by means of a wireless bridge. The devices of one cluster shall communicate with devices of the other cluster without being bridge aware. Under this scenario there are two different types of 1394 devices existing in each cluster. One device is a bridge portal and will have the bridge functionality. All the other 1394 devices in the cluster will not have the bridge functionality. As the device having the bridge functionality needs to have a specific buffer memory for buffering node-ID packets, usually there are two different types of physical layer circuits required for the different types of 1394 devices. The invention deals with the problem of how it can be realized to use in both different types of 1394 devices the same type of physical layer circuit. The invention solves the problem by means of configuration means in the physical layer circuit. These configuration means enable either to configure the physical layer circuit as a bridge portal physical layer circuit supporting the bridge functionality by buffering said node-ID packets in said buffer memory or else configuring the physical layer circuit as a standard physical layer circuit that disables the buffering of said node-ID packets. The new type of physical layer circuit is pin compatible with a standard physical layer circuit.

8 Claims, 3 Drawing Sheets

| 1 | 0 | Phy_ID | 0 | L | gap_cnt | sp | rsv | c | pwr | P0 | P1 | P2 | i | m |
|---|---|--------|---|---|---------|----|----|---|-----|----|----|----|---|---|
| Logical invers of first quadlet ||||||||||||||||

PHYSICAL LAYER CIRCUIT AND INTERFACE CIRCUIT

This application claims the benefit, under 35 U.S.C. § 365 of International Application PCT/EP03/00203, filed Jan. 11, 2003, which was published in accordance with PCT Article 21(2) on Jul. 31, 2003 in English and which claims the benefit of European patent application No. 02090038.7, filed Jan. 25, 2002.

The invention relates to a physical layer circuit for an interface circuit to a first communication bus and to an interface circuit.

BACKGROUND

The IEEE1394 bus has become an important communication bus in the field of home systems. The IEEE1394 serial bus already provides an internationally standardized and very widely accepted bus for data exchange between terminals from both, the consumer electronics field, the precise designation of the afore mentioned standard is: IEEE standard for high performance serial bus, (IEEE) STD 1394-1995, IEEE New York, August 1996. In the year 2000 an improved version had been finalized with the reference IEEE1394a-2000.

The IEEE1394 bus is a wired bus and it is specified that a maximum of 63 stations can participate in the communication over the bus lines. The 63 stations can be distributed in an apartment or a house. The maximum distance between two stations is 4.5 m, however there are also existing solutions that overcome the distance limitation.

A problem with all wired bus systems is that a bus cable needs to be installed in every room where a bus station shall be located. This problematic gave rise to the wish of a wireless extension of the IEEE1394 standard. A stand-alone device or a cluster of devices shall communicate with a first cluster by means of a wireless link or bridge.

Today, wireless communication systems already exist that can be used for the wireless link/bridge. The document "Broadband Radio Access Networks (BRAN; Hiperlan/2; Packet Based Convergence Layer; Part 3: IEEE1394 Service Specification Convergence Sublayer (SSCS)" defines a sub-layer emulating the IEEE link layer over an ETSI BRAN Hiperlan/2 wireless network. As such, it may be present in bridge devices between wired 1394 buses or in stand-alone wireless devices.

The inter-connection of the different buses (with different bus-ID's) involves an IEEE1394 bridge, which is currently under definition by the IEEE P1394.1 working group. Because of the use of different bus-IDs an application operating on bridges shall be bridge aware.

The box that connects the 1394 bus cable of a cluster to the is wireless bridge needs to have a standard conform 1394 inter-face but on the other hand it needs to have some additional functionality, which concerns the self-configuration phase of the network. The 1394 bus has life insertion capability and each time a device is added or removed from the bus a bus reset is performed. After a bus reset each bus node sends a self-ID packet to the bus, with which all other stations on the bus become aware of how many stations are present on the bus. The ID number is a 6-bit number so that 64 devices can be distinguished. There is a specific process defined in the 1394 standard, with which the ID numbers are assigned to the stations. This will be described in more detail later on.

For now it is sufficient to explain that this process will be done separately for both clusters that are connected through the wireless bridge. This is because the wireless bridge makes a bus reset isolation between both clusters. This is a problem and the customer would not accept a limitation in the control of bus stations due to the existence of two or more 1394 clusters in his home. The customer, therefore, wants to have a network topology being displayed in the form of one single cluster to be able to easily control the various devices from different locations. There is, therefore, the desire that all the stations in the network shall be configured as belonging to one 1394 bus and this calls for a modified self-configuration phase that must be performed in co-ordinated fashion in both clusters with the bridge circuit in-between.

The devices of the second cluster are not aware that they are connected via a wireless link to the network. To achieve transparent operation, it is necessary that the wireless boxes shall generate self-ID packets that reflect the topology on both buses.

A solution for this problem is already presented in the is European Patent Application 01 250 155.7 of the applicant. According to this solution, the physical layer circuit of the 1394 interface circuit for the boxes of the wireless bridge need to have an additional buffer memory in which the self-ID packet of the bus stations in the cluster, to which the wireless box is not connected, may be buffered. There is a process that transfers the self-ID packets of the bus stations in the cluster on the other side of the bridge over the wireless link after each bus reset.

A bottleneck of this solution is that different physical layer circuits need to be used in the boxes of the wireless link than in all the other bus stations of both clusters.

From the demands of modern production lines, it would be advantageous if the same physical layer circuit could be used in both types of bus stations regardless of whether they are part of the wireless link or not.

INVENTION

It is an object of the invention to provide a physical layer circuit for a communication bus that can be used in both types of bus stations, bridge portal box or out of bridge bus station.

This objective is achieved by a physical layer circuit that includes the necessary buffer memory for the bridge functionality but also comprises configuration means that enable to either configure the physical layer circuit as a bridge portal physical layer circuit supporting the bridge functionality or else to configure the physical layer circuit as a standard physical layer circuit that has the buffering of self-ID packets in the buffer memory disabled. This solution has the advantage that one type of physical layer circuit can be used in different types of bus stations, namely bridge portal bus stations or non-bridge is portal bus stations.

Further improvements of the physical layer circuit are possible by virtue of the measures evinced in the dependant claims. The configuration means may consist of a configuration register in the physical layer circuit that has one or more register places dedicated to the enabling or disabling of the node-ID packet buffering, i.e. bridge functionality. This has the advantage that the configuration could be performed simply with software means performing a write access to the configuration register during an installation process in the assembly line.

The physical layer circuit could have a pin connected with the configuration register. In this case it is possible to automatically configure the physical layer circuit after power on. Of course the corresponding potential high or low needs to be applied to the pin. Thus making the configuration by software means unnecessary.

Preferably, this pin is positioned at a place where a standard physical layer circuit that does not support the bridge functionality has a power supply pin ground or voltage supply. This means that the configuration pin would be pulled to low/high potential in an interface circuit for a standard bus station. The low/high value should be copied into the configuration register and when read out must be interpreted that the bridge functionality is switched off. Typically a physical layer circuit for a communication bus has a plurality of ground/voltage supply pins so that taking away one of these pins would not cause a great problem for the chip design.

Typically a physical layer chip for an IEEE1394 interface has more than one port to connect the bus cable. It is then advantageous that in an interface device that includes such a physical layer circuit one of these ports remains unused, i.e. it is not connected to a corresponding socket for a bus cable. This avoids problems during the self-configuration phase of the whole network. If this measure would not have been taken the bus topology could not correctly be reproduced because then the bus topology of only one cluster would be reflected during the self-configuration phase.

DRAWINGS

Exemplary embodiments of the invention are illustrated in the drawings and are explained in more detail in the following description.

EXEMPLARY EMBODIMENTS OF THE INVENTION

Figure 1:
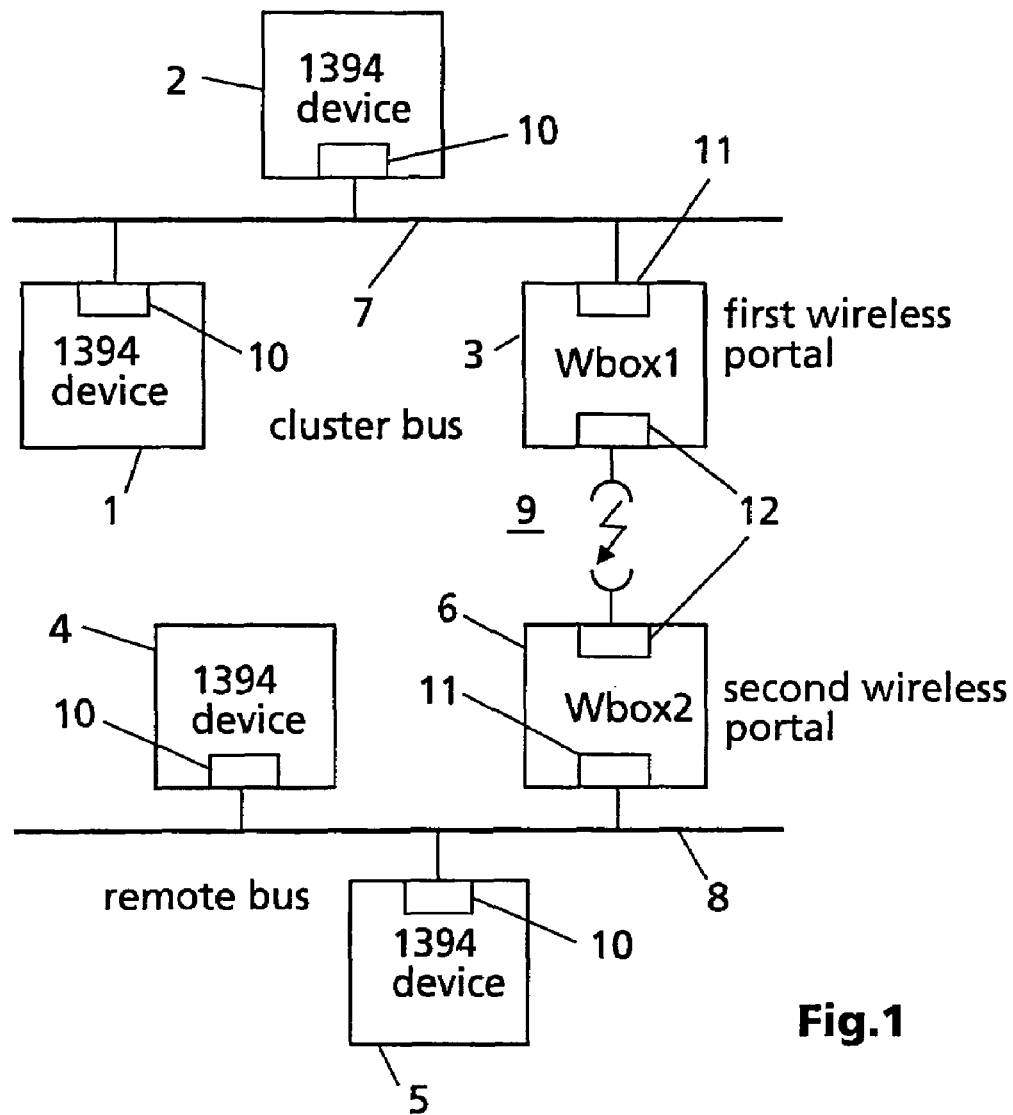
FIG. 1 shows two 1394 clusters connected to each other via a wireless bridge.

FIG. 1 shows two 1394 buses with 1394 bus stations and a wireless bridge in-between. The first 1394 bus has assigned reference number 7. A first and second 1394 device is shown with reference numbers 1 and 2. Such a device can be a consumer electronics device such as TV set, VCR, Camcorder, Set Top Box, DVD player, etc. or a computer device like PC, Notebook, etc. Each of these devices is a standard conform 1394 device and has a corresponding 1394 interface 10.

With reference number 3 a first transceiver box for the wireless link 9 is denoted. This box also needs to have a 1394 interface because it is also connected to the 1394 bus lines 7. The corresponding interface has reference number 11 in FIG. 1. This indicates already that it is not the same 1394 interface as that of devices 1 and 2. 1394 interface 11 has additional functionality involving the invention. Transceiver box 3 further has another interface 12 for wireless transmission. There are wireless protocols already existing supporting high-speed communication. As an example the Hiperlan system is mentioned. The document 'Broadband Radio Access Networks (BRAN); Hiperlan/2; Packet based convergence layer; Part 3: IEEE1394 Service Specific Convergence Sublayer (SSCS)" defines a sublayer emulating the IEEE1394 link layer over a ETSI BRAN Hiperlan/2 wireless network. Other examples of wireless communication protocols for the wireless link are the IEEE 802.11 system, the Bluetooth system and the DECT system.

In this application the term 'bridge' is used in the definition that both wireless boxes 3 and 6 build the bridge. This is indicated by reference number 9 in FIG. 1. The term 'bridge portal' is used in the definition that one wireless box 3 or 6 builds a bridge portal, see FIG. 1. Sometimes both expressions are used in a different way where bridge stands for the wireless box as an example and portal is a part of the box. It is expressively mentioned that the use of the expressions bridge and bridge portal in the claims shall not be regarded limiting.

There is another cluster of 1394 devices shown in FIG. 1 having its own 1394 bus 8. Again, two 1394 devices 4 and 5 are depicted having standard 1394 interfaces 10. A second box 6 for the wireless bridge 9 is connected to the bus 8 as well. For the conception of the invention it is required that the total amount of bus stations in both clusters together inclusive wireless transceiver boxes 3 and 6 is less than or equal to 63. This is because with the wireless bridge 9 both clusters are merged together and data communication between devices from different clusters is from the point of view of the 1394 devices by no means different than for communication between devices in one cluster. The maximum allowed number of bus nodes in a 1394 cluster is however 63. It is defined that the bus where a transceiver box of a wireless bridge has become the root device will be the remote bus. If in both buses a transceiver box of a wireless bridge has become the root device, a decision has to be made for example by game of dice.

A scenario with only one 1394 device in the remote cluster is described in the European Patent Application 00 402 901.3. A scenario with more than one 1394 device in the remote cluster is described in the European Patent Application 01 400 826.2.

Figure 2:
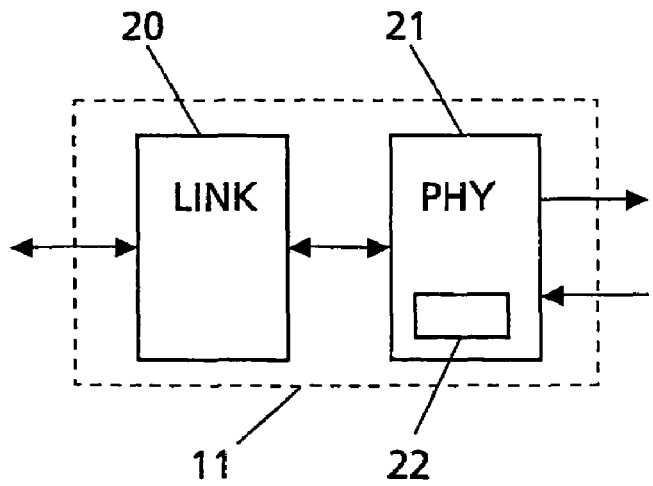
FIG. 2 shows a block diagram of a 1394 bus interface circuit.

FIG. 2 shows the principal structure of a 1394 interface 10 or 11. The 1394 interface is subdivided in two parts, a physical layer section 21 and a data link layer section 20. Both can be integrated in one single chip or two distinct chips. In principle it would also be possible that the data link layer section is implemented in software running on a powerful micro controller. Also the modified 1394 interface 11 has the same principle structure. The modification concerns a specific buffer memory 22 in the physical layer section and its management means. They are explained in detail in the European Patent Application 01 250 155.7. For the disclosure of the present invention it is therefore expressively referred also to this application.

To understand the modification of the physical layer chip it is helpful to first explain what happens in case of a bus reset. A bus reset is performed each time a 1394 device is plugged off (disconnected) from or plugged in (connected) to the bus. The 1394 bus standard provides full live insertion capability. An insertion or removal of a bus station is accompanied by a specific voltage change on the bus lines that is detected by electronic means providing the bus reset. After a bus reset a self-configuration phase follows for the network. During the self-configuration phase each bus station sends its self-ID packet to the bus to inform every other station in the network that it exists.

Figures 3, 6:
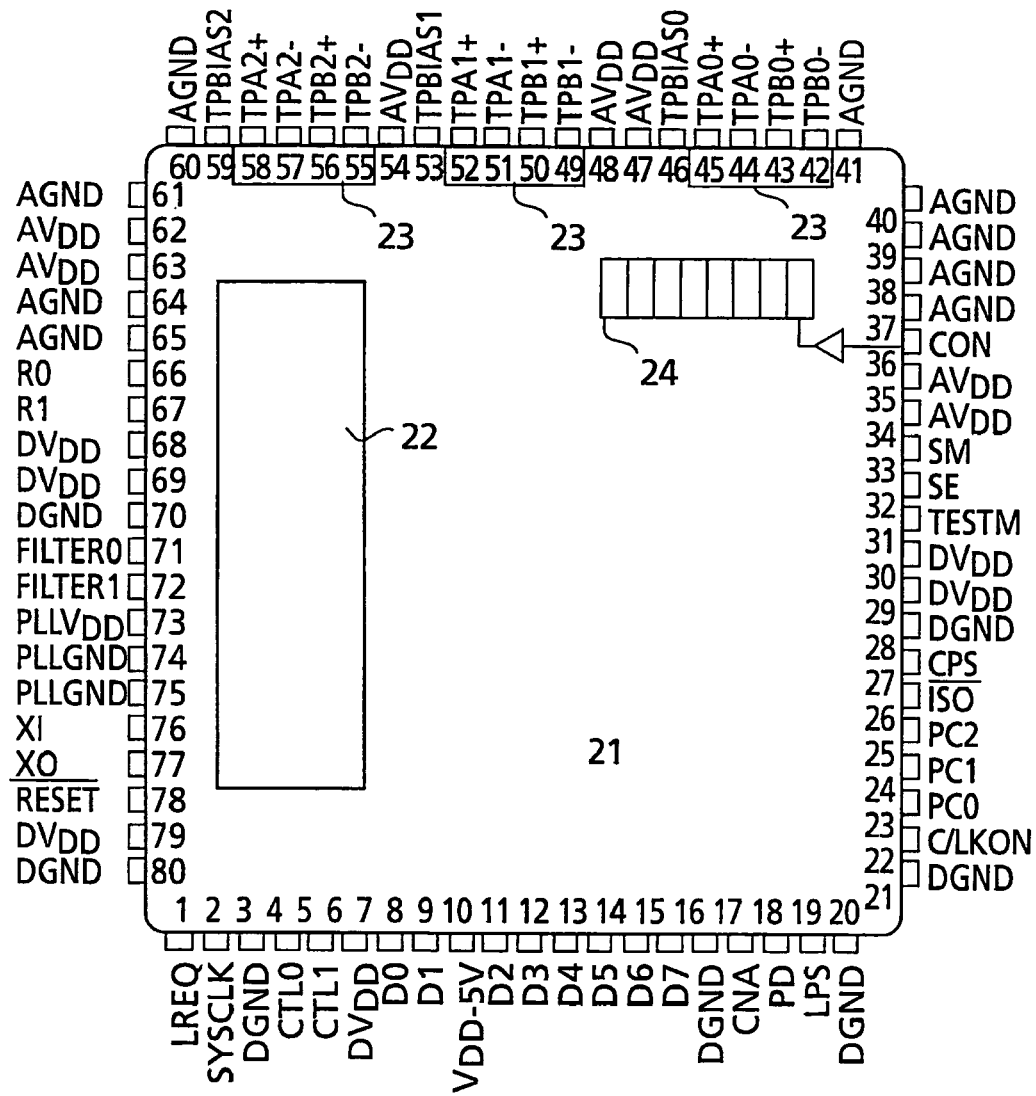
FIG. 3 shows the format of a self-ID packet.
FIG. 6 shows the pin assignments of a physical layer circuit according to the circuit.

A self-ID packet has the format of that in FIG. 3. It consists of 64 bits where the last 32 bits are the inverse of the first 32 bits. Of course all bits of the self-ID packets are explained in the 1394 standard itself. Some of them will be expressively explained here. At the beginning of a self-ID packet there is the physical ID-number of the bus station. This field has a length of 6 bits corresponding to the numbers 0 . . . 63. At the end of the self-ID packets there are 2-bit fields for the ports P0 to P2 of a bus station. With the two bits it can be notified not only the existence of the port in the station but also whether the port is active and connected to a parent or child in the bus topology. According to the IEEE1394 bus standard a bus station can be equipped with up to 16 ports. If a station has more than 3 ports their status will be reported in a second or third self-ID packet. The last bit m in the self-ID packet has the function to indicate whether a second or third self-id packet will be send. In these self-id packets the status of the ports of the 1394 device will be reported. With the 1394 bus data communication in half-duplex operation mode is possible. Therefore, only one station is sending data to the bus and the rest is listening. The bus is granted to the stations in a deterministic manner depending on the bus topology (in particular whether a station is branch or leaf). The physical ID number is assigned to the stations in the order of bus grant beginning from Zero. For addressing a data packet not only the physical ID-number (node-ID) is used. Each bus also has a bus-ID, which also needs to be taken into account during addressing.

In case of the bus structure shown in FIG. 1 a number of problems occur during self-configuration after a bus reset. The devices are not aware that they are connected via a wireless link to the network. The bridge makes a bus reset isolation. The self-ID packets need to be forwarded from one cluster to the other via the wireless link.

Now it is considered that a bus reset happened in the cluster bus 7. The reset is detected by all stations 1, 2, 3 in the cluster. After the bus reset the stations will send their self-ID packets one after the other. Each station in the cluster will collect the corresponding information in a higher software layer, e.g. in the transaction layer in order to be able to generate the right addresses later on. The interface 11 in the transceiver box 3 also receives each self-ID packet and forwards them via the wireless link to the second transceiver box 6. Also the box 3 generates a self-ID packet and sends it to the 1394 bus 7. In the first attempt wireless transceiver box 3 operates in legacy mode and generates a self-ID packet without taking into account that in case that the bridge is replaced by a 1394 cable, it would have a different physical ID number.

After having-collected all self-ID packets from the cluster bus, the box 3 initiates a bus reset on the cluster bus by software means. Again the self-ID packets are transmitted over the bus. The difference is that when it is the turn of the box 3 to send its self-ID packet, it will generate not only its own self-ID packet but also all the self-ID packets of the stations in the remote cluster, whereby the box 3 generates the self-ID packets under consideration of the topology, which would result if the wireless link would be replaced by a 1394 cable. In the following the self-ID packets generated by the box 3 in representation of the stations in the cluster bus are called artificial self-ID packets.

Next, a bus reset is also initiated on the remote bus 8 by software means in box 6. The box 6 has collected all self-ID packets from the cluster bus and generates the corresponding artificial self-ID packets in this phase. After this phase the self-configuration is finalised and normal data communication can continue.

As explained above to achieve transparent operation, it is necessary that the Physical Layer chip in the interfaces 11 of the wireless transceiver box 3 and 6 generate self-ID packets that are reflecting the topology on both buses.

To do that the content of artificial self-ID packets to be generated automatically by the physical layer circuit will be stored in a specific buffer memory 22 in the physical layer circuit which can be a register bank or RAM. Taking into account the format of a self-ID packet, only the information of the first quadlet of each self-ID packet will be stored in this register bank. The second quadlet of each self-ID packet will be created on-the-fly by the physical layer circuit itself (logical inverse of the first quadlet).

The number of self-ID packets per node is dependent on the implemented ports per node. The maximum number is three self-ID packets per node according to the IEEE1394a-2000 version and four in the standard IEEE1394-1995. To be compatible with the old version leads to a minimum size of the buffer memory of 16 byte*62 nodes=992 bytes.

The micro controller of the wireless link will provide the information of the artificial self-ID packets. This information is stored in the buffer memory of the physical layer circuit.

Figure 4:
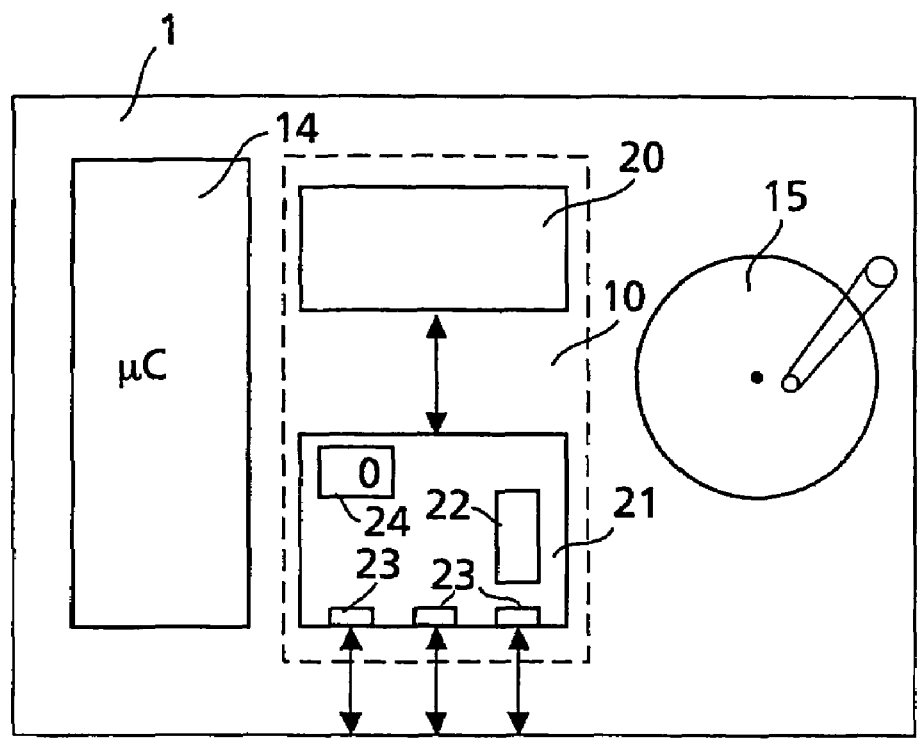
FIG. 4 shows a block diagram of a standard bus station not having the bridge functionality activated.

FIG. 4 shows a block diagram of a hard disk drive. The three main parts of the hard disk drive are the hard disk drive 15, a micro controller 14 and IEEE1394 interface 10. From these components only the interface 10 is shown in greater detail. The illustration again shows that the interface circuit 10 comprises the two main blocks physical layer circuit 21 and data link layer circuit 20. From the physical layer circuit 21 the three 1394 ports 23, the buffer memory 22 and a configuration register 24 are separately shown. The hard disk drive is configured as a standard 1394 bus station. In this case the entry in the configuration register 24 is 0, which means that the physical layer circuit 21 does not support the bridge functionality and, therefore makes no use of buffer memory 22 for buffering self-ID packets that have been received via the wireless bridge 9 from the remote bus. In this case all the three port 23 are connected to corresponding 1394 sockets in the housing of hard disk drive 1. The configuration of physical layer circuit 21 with the configuration register 24 is that the physical layer circuit 21 does not have the additional bridge functionality, which especially means that the buffer memory 22 is not used to store any self-ID packets.

Figure 5:
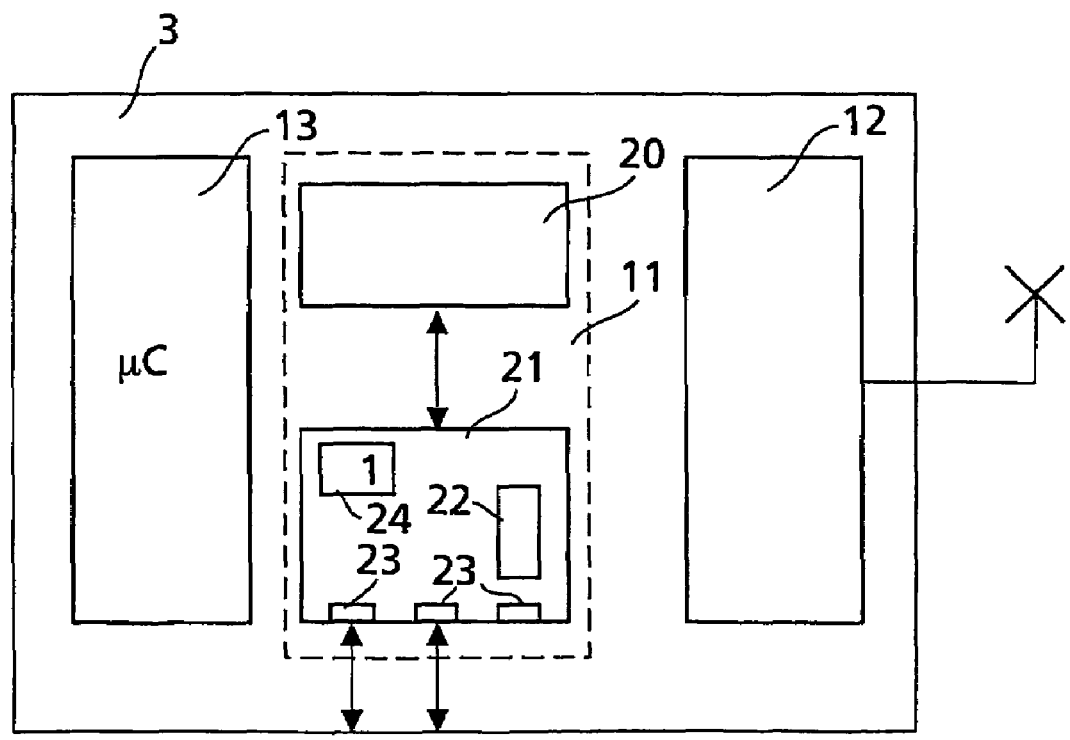
FIG. 5 shows a wireless box of a wireless link which is a bus station having the bridge functionality activated.

FIG. 5 shows a wireless box of the wireless link 9 in block diagram from. This box also consists of three main parts. Reference number 13 denotes a micro controller, reference number 11 denotes a 1394 bus interface and reference number 12 denotes a Hiperlan/2 interface. The Hiperlan/2 interface is connected with a receiving and transmission antenna as shown in FIG. 5. Again, only the 1394 interface 11 is shown in greater detail. Also this interface circuit 11 consists of the two main parts physical layer 21 and data link layer circuit 20. In this case the entry in the configuration register 24 is 1, which means that the physical layer circuit 21 has bridge functionality and, therefore uses buffer memory 22 for buffering self-ID packets that have been received via the wireless bridge 9 from the remote bus. Also, only two of the three ports 23 are connected with corresponding sockets in the housing of the wireless box 3. One of the three ports 23 is left open, which means that over this port no data exchange physically takes place. However, the occupied port 23 can be regarded as a virtual port over which the communication to the counter part of the wireless box namely wireless box 6 will take place. The communication to the wireless box 6 will not physically take place over this unoccupied port 23. The data that needs to be transferred to this box and will be received from this box have to be reformatted in a higher layer, e.g. application layer where they can be shifted to the Hiperlan/2 interface 12 and then they will be communicated to the other side with the specified Hiperlan/2 protocol. The virtual port, however, is necessary so that the physical layer circuit 21 will generate the correct self-ID packets after the bus reset taking into account that behind the wireless bridge there are some more devices connected to the 1394 bus over the virtual port.

In FIG. 6 the pin assignments of a physical layer circuit according to the invention are shown. These pin assignments are identical to an existing physical layer IC from Texas Instruments named TSB41LV03A, except for one pin. This pin that is modified is the pin with the number 36. In the existing Texas Instruments IC this pin is also a ground pin named AGND like the four pins above pin 36. The physical layer circuit according to the invention has at this place a so-called configuration pin CON. This pin, therefore, is not being connected with the analogue ground of the IC. It is instead connected with a read/write register 24. It is sufficient that the pin is connected to only one register place of the read/write register 24.

All the other pin assignments shown in FIG. 6 are explained in the data sheet of the above-mentioned Texas Instruments physical layer IEEE1394 IC. For the disclosure of the invention, it is therefore expressively also referred to this data sheet. Separately shown are also the three IEEE1394 bus ports 23 as well as the buffer memory 22 that is an extra part of the new designed chip. This buffer memory is not contained in the Texas Instruments chip TSB41LV03A. In the embodiment shown in FIG. 6 the read/write register 24 will be loaded with a value corresponding to the potential that is pulled to pin 36 during the initialisation phase of the chip. After this initialisation phase the software can read out this read/write register 24 to make the necessary configuration of the chip (e.g. by programming the state machine for buffer management).

How the artificial self-ID packets will be transferred into the buffer memory 22 is already explained in the above-mentioned European Patent Application 01 250 155.7 of the applicant. In summary, if an artificial self-ID packet is received via the Hiperlan/2 interface 12, from the higher layer a write access to a specific register in the configuration and status register block of the physical layer circuit is made. This write access will be interpreted as a corresponding income of an artificial self-ID packet and the data words are shifted into the buffer memory 22. Correspondingly the address counter for buffer memory 22 is incremented. Therefore, there do not need to be some additional pins for this additional bridge functionality in the physical layer circuit.

The invention is not restricted to the disclosed embodiment. Different modifications are possible that shall also fall within the scope of the claims of the present application. The configuration pin of the physical layer circuit can be an extra pin that is not used when the physical layer circuit is integrated in a standard IEEE1394 bus interface not having bridge functionality.

The number of ports for bus cables need not be all connected with corresponding sockets. In one 1394 device more of the ports could be connected with corresponding sockets than in the other depending on the application.

The writing into the configuration register 24 could be done in asynchronous fashion automatically by hardware after power-on of the physical layer circuit. Many different hardware implementations can be used for this.

The bridge does not necessarily need to be a wireless bridge and especially not necessarily be a Hiperlan/2 bridge. Also, the communication bus does not necessarily be an IEEE1394 bus.

The invention claimed is:

1. Physical layer circuit for an interface circuit to a first communication bus, the physical layer circuit comprising a buffer memory for node-ID packets received via a bridge circuit from a second communication bus, wherein the physical layer circuit comprises configuration means that enable to either configure the physical layer circuit as a bridge portal physical layer circuit supporting the bridge functionality by buffering said node-ID packets in said buffer memory or else configure the physical layer circuit as a standard physical layer circuit not supporting bridge functionality by disabling the buffering of said node-ID packets.

2. Physical layer circuit according to claim 1, the configuration means comprising a configuration register having one or more register places dedicated to the enabling or disabling of the node-ID packet buffering.

3. Physical layer circuit according to claim 2, wherein the configuration register is a read/write register.

4. Physical layer circuit according to claim 2, wherein a pin of the physical layer circuit is connected with the register place dedicated to the enabling or disabling of the node-ID packet buffering.

5. Physical layer circuit according to claim 4, wherein the pin of the physical layer circuit is positioned at a place where a standard physical layer circuit not supporting the bridge functionality has a power supply pin, namely ground pin or voltage supply pin.

6. Physical layer circuit according to claim 1, wherein the first and second communication bus is an IEEE1394 bus and the bridge is a wireless bridge that performs wireless communication according to the Hiperlan/2 standard.

7. Physical layer circuit according to claim 1, comprising a number of n ports for the first communication bus, $n \in [2, 3, \ldots]$.

8. Interface device for a first communication bus comprising a physical layer circuit according to claim 7, wherein said physical layer circuit is configured as a bridge portal physical layer circuit with the buffering of node-ID packets being enabled, wherein at maximum n−1 of the ports for the first communication bus are connected to corresponding sockets for bus cable plug insertion.

* * * * *